(12) United States Patent
Gauvin et al.

(10) Patent No.: US 7,197,489 B1
(45) Date of Patent: Mar. 27, 2007

(54) METHODS AND APPARATUS FOR MAINTAINING OBJECT DATA FOR COMPONENTS IN A NETWORK

(75) Inventors: Francois Gauvin, Salem, MA (US); Joshua Onffroy, Norton, MA (US); Serge G. Marokhovsky, Upton, MA (US); Steven Tanaka, Shrewsbury, MA (US); Valeria Altman, Newton, MA (US); Gregory N. MacKinnon, Somerville, MA (US)

(73) Assignee: EMC Corporation, Hopkinton, MA (US)

( * ) Notice: Subject to any disclaimer, the term of this patent is extended or adjusted under 35 U.S.C. 154(b) by 491 days.

(21) Appl. No.: 10/335,497

(22) Filed: Dec. 31, 2002

(51) Int. Cl.
*G06F 7/00* (2006.01)

(52) U.S. Cl. .......................... 707/1; 707/100; 707/102; 707/103 R; 709/223; 375/222; 370/241

(58) Field of Classification Search ................ 719/316; 709/230–237, 248, 250, 223; 707/103 R; 370/241; 375/222; 710/36; 718/102
See application file for complete search history.

(56) References Cited

U.S. PATENT DOCUMENTS

| | | | | |
|---|---|---|---|---|
| 4,969,093 | A * | 11/1990 | Barker et al. ................ | 718/102 |
| 6,122,639 | A * | 9/2000 | Babu et al. .............. | 707/103 R |
| 6,597,732 | B1 * | 7/2003 | Dowling ...................... | 375/222 |
| 2003/0208581 | A1 * | 11/2003 | Behren et al. ............... | 709/223 |
| 2003/0229689 | A1 * | 12/2003 | Raghavan et al. .......... | 709/223 |
| 2005/0033878 | A1 * | 2/2005 | Pangal et al. .................. | 710/36 |
| 2005/0157654 | A1 * | 7/2005 | Farrell et al. ............... | 370/241 |

OTHER PUBLICATIONS

Newton'Telecom Dictionary, Harry Newton, Mar. 2004, CMP Books, 20th Updated and Expanded Edition, p. 761.*
Microsoft Computer Dictionary, Peter Aiken et al, 2002, Microsoft Press, Fifth Edition, p. 114.*
Newton's Telecom Dictionary, Harry Newton, Mar. 2004, CMP Books, 20th Updated and Expanded Edition, p. 761.*
Microsoft Computer Dictionary, Peter Aiken et al, 2002, Microsoft Press, Fifth Edition, p. 114, 327, 487.*
Microsoft Computer Dictionary, Peter Aiken et al, 2002, Microsoft Press, Fifth Edition, p. 114, 327, 487.*

* cited by examiner

*Primary Examiner*—Don Wong
*Assistant Examiner*—Patrick A. Darno
(74) *Attorney, Agent, or Firm*—Chapin IP Law, LLC; Barry W. Chapin, Esq.

(57) ABSTRACT

Mechanisms and techniques are disclosed that maintain managed object data associated with components in a network such as a storage area network by receiving management data associated with components operating in a storage area network and matching the management data to existing objects in a managed object database. For each existing managed object that matches the management data, the system updates object data within the existing managed objects with the matching management data. For management data not matching the existing managed objects in the managed object database, the system creates at least one new managed object containing the non-matching management data. The system further analyzes the management data to infer an existence of additional components operating in the storage area network that do not have corresponding managed objects in the managed object database and creates new managed objects in the managed object database for components within the storage area network whose existence is inferred.

29 Claims, 7 Drawing Sheets

METHODS AND APPARATUS FOR MAINTAINING OBJECT DATA FOR COMPONENTS IN A NETWORK

FIELD OF THE INVENTION

The present invention generally relates to computer and software systems that allow for remote management of network resources in a network such as a storage area network.

BACKGROUND OF THE INVENTION

Computer networks provide an interconnection of various components such as client and server host computer systems, data communications devices, data storage systems, peripheral devices, software applications and the like. A typical computer network owned by an organization such as a corporation often spans a large geographical area and a network management software application operating on a network management computer system or workstation is capable of remotely managing the components operating within the computer network. A network manager (i.e., a person) responsible for management of the network operates the network management software application to perform management tasks such as performance monitoring, network analysis and remote configuration and administration of the various components operating within the computer network.

Typical conventional network management software applications capable of remotely managing components within a network often utilize one or more network management protocols to communicate between the network management workstation and the remotely manageable components within the network. An example of a conventional network management protocol is the Simple Network Management Protocol (SNMP). Conventional network management protocols such as SNMP rely on the operation of agent programs that perform (e.g., execute) on various remote components in the computer network such as host computer systems (e.g., servers), data communications devices (e.g., routers or switches) and data storage systems. The agents periodically collect management data concerning the operation of the components that they monitor. The agents use the network management protocol to periodically transfer the collection of management data over the network to the network management software application. This may also be done in response to certain management events or traps that occur within network components that the agents continuously monitor.

When the conventional network management software application receives management data from one or more agents operating within the network, the conventional network management software application copies the data to data structures representing the managed components in the network and presents this management data to the network manager, for example via a graphical user interface, to keep the network manager informed about the current operational status of components within the network that the agents are responsible for monitoring. In addition, conventional network management software applications allow the network manager to transfer management commands to the agents operating on the remote components within the network in order to remotely control and manage these components.

Conventional network management software applications and their associated management agent programs utilize a library of predefined data structures referred to collectively as a Management Information Base (MIB) in order to store management data associated with remotely manageable components. The MIB contains predefined data structures and parameter definitions for various types of remotely manageable components such as hosts, data communications switches and other common network components. When a manufacturer of a network component releases a new component for sale, the manufacturer typically indicates that the component is compatible with management parameters defined in a common MIB. As an example, if a manufacturer releases a new data communications switch that is remotely manageable via SNMP, the manufacturer of the switch may indicate that the switch is compatible with a standard MIB (e.g., MIB III) containing a series of management parameters and definitions associated with common functions performed during remote switch management such as parameters to turn switch ports on and off and to gather bandwidth statistics about switch ports.

When a network manager installs the new remotely manageable component (e.g., the switch) within the computer network, the network manager can configure the network management software application to indicate to that software application the presence of the new remotely manageable component within the network. During such configuration, the network manager can indicate to the network management software application that the new component is compatible with a standard MIB definition for components of a common type, such as switches. In this manner, the network management software application can create a data structure to store the management data received from an agent operating on the new remotely manageable component. To further this example, suppose the network included components such as a host computer system, a data communications device such as a switch and peripheral devices such as network attached printers. Respective agents may operate in conjunction with each of these network components to provide management data to the network management software application in conformance with component management data definitions within the common MIB. The MIB thus has default data definitions for a host computer system, a switch and a printer. Upon startup of the network management software application, this application instantiates data structures in memory of the network management computer system to represent the various manageable components such as the switch, the host computer system and the remote printers in order to store management data received from agents operating in those components of the computer network.

SUMMARY

Conventional mechanisms and techniques for collecting management data and processing this management data for remotely manageable network components for use by network management software applications suffer from a variety of deficiencies. In particular, conventional network management software applications rely in part upon a network manager (e.g., a person) to predefine, to the network management software application, which devices exist and are remotely manageable within the computer network. In addition, network management software applications are limited by component definitions existing within the standard MIB for use in the collection and representation of management data associated with remotely manageable components for which the network management application has been aware of by a network manager. Accordingly, conventional network management software applications only provide a limited representation of an entire computer network. Some conventional network management applications may detect the presence of remote components when an agent operating on or in conjunction with such components reports management data back to the management application for the first time. However, conventional network management systems lack the ability to detect operation of components that do not have corresponding associated agents. In other words, components that do not execute agents, or that do not have agents responsible for colleting management data regarding the components remain unrecognized by conventional network management software application even though these components still exist and operate within the network.

As an example, consider a network such as a storage area network (SAN) containing an interconnection of host computer systems (e.g., servers) coupled to a number of different data storage systems through one or more connectivity devices such as switches. The host computer systems may operate agent software processes to collect management data concerning the operation of the host computer systems, the connectivity devices and the data storage systems. A conventional storage area network management application that receives such management data from the agents can provide a graphical representation of the storage area network based upon the management data and can issue commands to the network components that have associated agents that collect management data on their behalf. However, conventional storage area network management applications are limited to informing the network manager only about the existence and status of those components from which agents directly collected management data. Other components related to the components from which the agents collected management data, but which do not have corresponding agents of their own, remain unrecognized and un-represented in the storage area network (e.g., a graphical presentation) that the management application presents to the network manager. As a result, the network manager may receive an incomplete perception or view of the actual network configuration and of the state of components within the network that do not have associated management agents.

Continuing with the aforementioned example, suppose a particular primary data storage system operating within the storage area network was configured with a redundant data communications link that operated an inter-component protocol to a secondary data storage system to allow the secondary data storage system to provide redundant fault-tolerant data storage system failover in the event that the primary data storage system experiences a severe failure. A host computer system coupled to the primary data storage system may operate a data storage system network management agent to collect management data related to the primary data storage system. Upon receipt of this management data by the conventional network management application, the conventional network management application can indicate to the network manager the existence and operational state of the primary data storage system. However, the conventional network management application will be unaware of the existence of the secondary data storage system unless either the network manager specifically manually indicates the presence of this secondary data storage system to the network management application or the secondary data storage system has an agent responsible for reporting management data to the network management application.

As a result, in large network installations where there may be many network managers operating and managing different components within the network, if a second network manager configures the redundant operation (i.e., invokes operation of the inter-component protocol) between the primary and secondary data storage systems without informing the first network manager, when the first network manager operates the network management software application, he or she will be unaware that the second data storage system exists and is redundantly coupled to the primary data storage system.

Embodiments of the invention significantly overcome such deficiencies and provide mechanisms and techniques for maintaining and detecting managed object data associated with components within a network such as a storage area network. Embodiments of the invention are able to analyze management data received from agents operating in conjunction with components in a network, such as a storage area network, and are able to infer or deduce the existence of other additional components within the network for which the management data was not specifically collected. In other words, the system of the invention can analyze collected management data from one component for indications or clues concerning the existence of other components within the storage area network. Based on this inferential data, embodiments of the invention can create managed objects to represent inferred components in a managed object database to provide a more complete representation of the network.

As an example, embodiments of the invention can analyze inter-component data structures present within management data to detect references to additional components operating within the network for which management data has not been received or collected. As another example, embodiments of the invention can detect evidence of operation of an inter-component protocol between a component from which management data was received and another component that is not yet present, recognized or represented by a managed object within the network management application. In such circumstances, embodiments of the invention can infer the existence of the additional "inferred" components and can create a managed object within the managed object database to represent these newly discovered components. The network management application can provide a representation of component (e.g., can create an icon for each inferred component in a graphical map of the network) to the network manager to indicate to the network manager that the additional components exist within the network. In this manner, embodiments of the invention provide for a correlation of management data to detect or infer or deduce the existence of additional components within the network, thus providing a more complete network representation to the network manager.

Using the example provided above of primary and secondary data storage systems coupled in a redundant manner, according to embodiments of the invention, a management agent can collect and transmit management data to a network management application configured in accordance with one embodiment of the invention. During an analysis of the network management data as will be explained, embodiments of the invention can detect evidence of operation of the inter-component protocol that provides the redundant data storage between the primary and secondary data storage systems. The evidence may be, for example, in the form of a management event related to the first data storage system component that indicates operation of the protocol. Based on this analysis, the network management application can deduce or otherwise infer that the primary data storage system for which management data was collected is also coupled to a secondary data storage system for which no management data has been collected as of this point in time.

However, since the existence of the operation of the inter-component protocol indicates that the secondary data storage system exists, embodiments of the invention are able to create a managed object to represent this secondary data storage system and are able to graphically rendered this secondary data storage system as being coupled to the primary data storage system in a graphical representation of the network to the network manager.

Various other component inference techniques are disclosed herein to allow embodiments of the invention to create representations of managed objects for which no specific management data has been collected from those network components represented by those objects. In other words, embodiments of the invention disclosed multiple techniques for inferring the existence of various types of network components operating, for example, within a storage area network and are thus able to provide a more accurate representation of the network to the network manager as compared to conventional management systems that require management data to be collected from each component in order to represent that component to the network manager.

More specifically, embodiments of the invention operate within or in conjunction with a network management application (i.e., that is equipped or configured with processing of embodiments of the invention) and provide an object manager that maintains the state of a managed object database. The object manager receives management data associated with components operating in a storage area network. As an example, agents operating within host computer systems, connectivity devices (e.g., switches) or within data storage systems within a storage area network can provide management data to the network management application equipped with an object manager configured in accordance with embodiments of the invention. The object manager attempts to match the management data to existing objects in a managed object database. Generally, the managed object database contains a hierarchical arrangement of objects to represent various components and resources within the network such as host components, connectivity components and data storage system components. The hierarchy of managed objects for a component, such as a host component for example, can include sub-objects in the object hierarchy to represent manageable entities or sub-components with a host computer system, such as adapter cards, adapter ports within the adapter cards, software processes and so forth.

For each existing managed object that matches the management data, embodiments of the invention update object data within the existing managed objects (that currently exist within the managed object database) with the matching or corresponding management data. For management data not matching the existing managed objects in the managed object database, the object manager creates at least one new managed object, in the managed object database, containing the non-matching management data. In this manner, as management data is collected for the first time from components operating within a network such as a storage area network, the object manager can populate the managed object database with objects to represent the components from which the management data was collected.

In addition, to updating existing managed objects with current management data and creating new managed objects for newly collected management data, the object manager can analyze the management data to infer an existence of additional components operating in the storage area network that do not have corresponding managed objects in the managed object database. In other words, as briefly explained in the aforementioned example, embodiments of the invention are able to review the management data for certain clues or inference data that indicates the existence of other components operating within the network, even though no management data was specifically collected from these other components. Examples of inferring the existence of components in this manner include detecting evidence of operation of protocols operating between components such as remote data facility maintenance protocols (e.g., SRDF) allowing two or more data storage systems to remain in synchronicity with each other in the event of failure of one of the data storage systems, data mirroring protocols allowing redundant copies of the data to be maintained in multiple storage device, data migration protocols allowing periodic backup of data from one component to another, and peripheral control protocols that indicate that the component (i.e., from which management data was collected) is coupled to a peripheral component(s) or device for which no management data has yet been collected and thus no managed object(s) yet exists within the managed object database. Other types of inference in other embodiments of the invention can rely on detecting and analyzing inter-component data structures, such as access control maps, user defined groups, volume manager information, zone information, world wide names, file system data structures, storage pool data structures, and other such information for references to undiscovered components in the network.

In response to this analysis, the object manager configured according to embodiments of the invention creates new managed objects in the managed object database for components within the storage area network whose existence is inferred. As a result, the managed object database grows over time to contain objects corresponding to components from which management data was specifically collected and further grows to contain objects that represent components whose existence is inferred from analysis of the management data received from existing components. Through the use of embodiments of the invention, a network management application is able to discover the existence of components not under direct management of the application and is thus able to render a representation of the network to the network manager that more closely resembles actual configuration of the network.

Other embodiments of the invention include a computerized device, such as a network management computer system, workstation or other computer system configured to process all of the aforementioned method operations disclosed herein as embodiments of the invention. In such embodiments, the computer system includes a memory system, a processor, an interface, a managed object database and an interconnection mechanism connecting the processor, the memory system, the interface and the managed object database. The memory system is encoded with an object manager application that when performed on the processor, produces an object manager process that operates as explained herein.

Other arrangements of embodiments of the invention that are disclosed herein include software programs to perform the method embodiment steps and operations summarized above and disclosed in detail below. More particularly, a computer program product is disclosed that has a computer-readable medium including computer program logic encoded thereon that when performed in a computer system provides operations of the object manager as explained herein. That is, the computer program logic, when executed on at least one processor with a computing system, causes the processor to perform the operations (e.g., the methods)

indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computer system to cause one or more processors in the computer system to perform the techniques explained herein as embodiments of the invention. Software processes that operate in a collection of computer systems, such as in a distributed group of storage area network management servers can also provide the system of the invention.

It is to be understood that the system of the invention can be embodied strictly as a software program, as software and hardware, or as hardware alone. Example embodiments of the invention may be implemented within EMC's Control Center software application that provides management functionality for storage area network resources and in computer systems that operate the Control Center software. Control Center is manufactured by EMC Corporation of Hopkinton, Mass., USA.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

Embodiments of the invention provide object manager mechanisms and techniques that are able to receive and store management data into a database of managed objects for use by a network management application for management of components in a network. In addition to being able to store management data into managed objects that correspond to existing components, the object manager is able to analyze management data received from agents to infer or deduce the existence of other additional inferred components within the network for which or from which the management data was not specifically collected. In other words, the system of the invention can analyze the management data for indications or clues concerning the existence of other components within the storage area network and based on these indications, can infer the existence of these additional components and can create objects in the managed object database to represent these inferred components and their connectivity or operational relationships with other components in the storage area network represented by other managed objects in the managed object database. This allows the object manager of this invention to provide a more complete representation of a network such as a storage area network for rendering by a management application (equipped to operate as part of, or in conjunction with the object manger) to a network manager.

As an example, embodiments of the invention can analyze inter-component data structures present within management data to detect references in these structures to additional components operating within the network for which management data has not been specifically collected or received and can then create objects to represent these components. The object manager of this invention can also detect evidence of operation of inter-component protocols between a component from which management data was received and another component that is not yet present or represented by an existing object in the managed object database. Based on this, the object manager can create and populate new managed objects in the database to represent these additional inferred components. In this manner, embodiments of the invention provide for a correlation mechanism to review and correlate management data to detect, infer or deduce the existence of additional components within the network thus providing a more complete network representation to the network manager.

Figure 1:
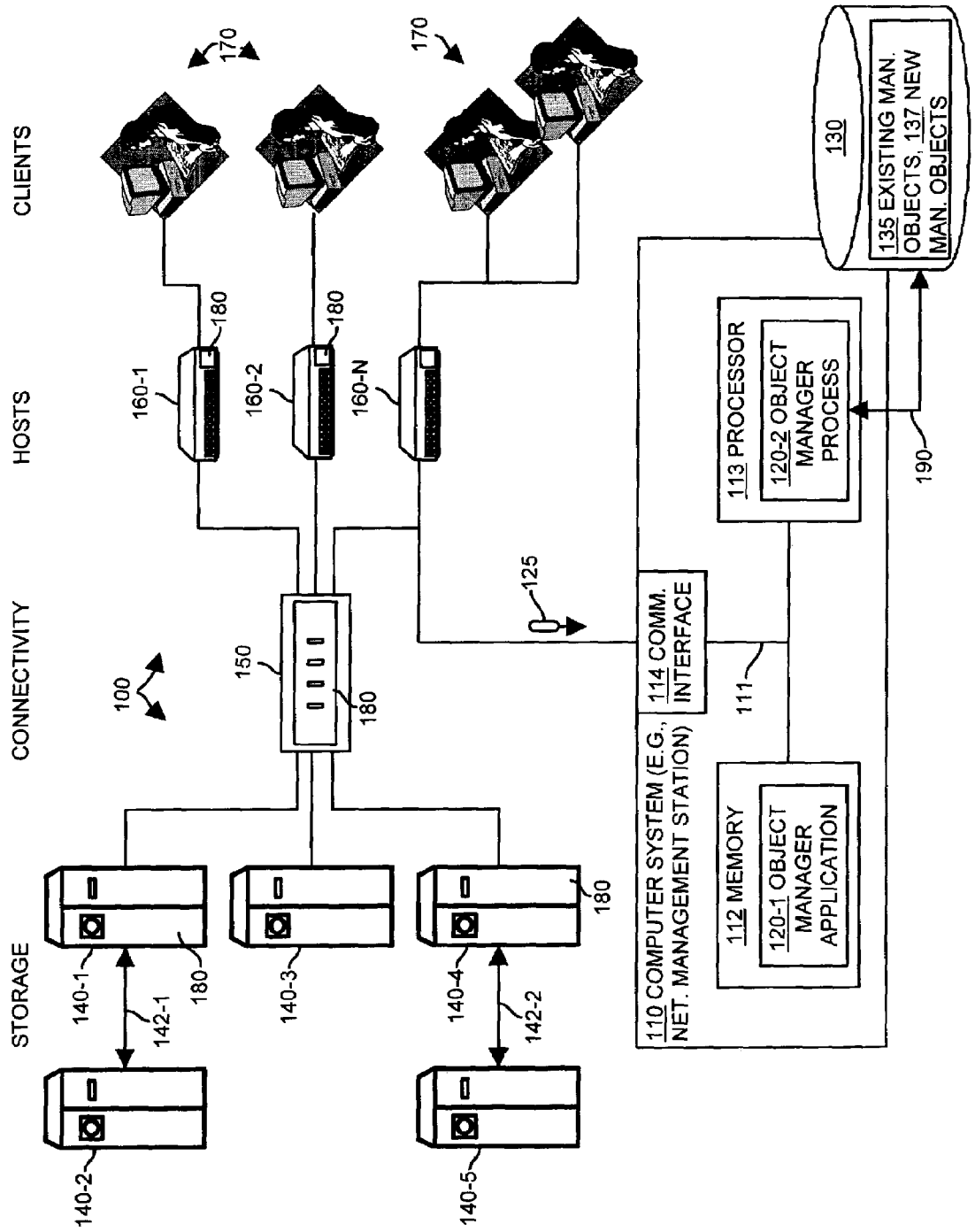
FIG. 1 illustrates an example storage area network and computing system environment including a management station computer system configured to operate an object manager in accordance with embodiments of the invention.

FIG. 1 illustrates an example of a network 100 such as a storage area network suitable for use in explaining operations of example embodiments of the invention. The storage area network 100 includes a connectivity component 150 such as a switch that interconnects data storage components 140-1 through 140-5 that may be, for example, storage arrays and host components 160-1 through 160-N that may be, for example, server computer systems. Groups of client computer systems 170 operate to access data from the host components 160 that in turn access data stored within the storage components 140 through the connectivity component 150. In addition, the storage area network 100 includes a network management station computer system 110 that operates a to manage components within the storage area network 100.

The example network management station computer system 110 includes an interconnection mechanism 111 such as a data bus or other circuitry that interconnects the memory system 112, a processor 113 and a communications interface 114. The memory system 112 may be any type of computer readable medium or memory such as random access memory (RAM) or read-only memory (ROM) or volatile or nonvolatile magnetic memory such as a disk or other local storage medium. The memory 112 is encoded with logic instructions and data that form an object manager application 120-1 configured in accordance with one example embodiment of the invention. The processor 113 may be any type of hardware or logic circuitry such as a microprocessor, central processing unit, application-specific integrated circuit, or other electronic circuitry that operates, runs, executes, interprets or otherwise performs the object manager process 120-2. In this example, the object manager process 120-2 is an instantiation of the object manager application 120-1 that is executed by the processor 113 to perform processing operations according to embodiments of the invention as disclosed herein.

Generally, the object manager application 120-1 represents executable code such as machine language instructions or object code that the processor 113 is able to interpret or execute in order to create or form the object manager process 120-2 which represents a run-time embodiment of the invention. Generally, the object manager application 120-1 and the object manager process 120-2 are collectively referred to herein as the object manager 120 for purposes of description of operation of embodiments of the invention. It is to be understood that the object manager application 120-1 is an embodiment of the invention that represents software code that, if performed within a processor 113 can provide the functionality explained herein and that the object manager process 120-2 is another embodiment of the invention that represents the run-time operation as explained herein.

The network management station computer system 110 further includes a managed object database 130 containing a hierarchical collection of existing managed objects 135 and new managed objects 137 that the object manager process 120-2 can access as shown at location 190, as will be explained. Each existing managed object 135 and new managed objects 137 represents an entity or component within the storage area network 100. As an example, consider a host computer system component 160 that includes network interface adapter cards (not specifically shown in this example) to couple to one or more client computer systems 170 and to couple to the connectivity switch component 150. Each adapter card may contain one or more data communications ports (also not specifically shown). The host component 160 may also execute an operating system (not shown) to control the general operation of the host 160. In addition, software processes may execute on the host component 160. Each of these parts or elements of the host component 160 can be considered sub-components that may be remotely manageable or identifiable by the network management station computer system 110. To allow such management or identification to take place, each of these elements of the host component 160 may have one or more corresponding existing managed objects 135 within the managed object database 130 to store and maintain the current operational state and/or identity of the host component 160 (and all of its sub-components). A network management application executing within the computer system 110 (that incorporates the object manager 120 of this invention) can access this set of existing objects 135 (including any new added objects 137, as will be explained) to obtain the current state of the host components as contained within the existing objects 135.

Certain of the host, connectivity and storage components 140, 150 and 160 existing within the storage area network 100 operate (e.g., execute or interpret) a respective management agent 180 to collect and forward management data 125 to the network management station computer system 110 for receipt by the object manager 120 for storage within the existing objects 135. The object manager 120, as will be explained, can analyze the management data 125 to produce new managed objects 137 based on inferences made from data structures, reference to protocols, and other information contained within the management data 125. Note that some components do not operate management agents 180, such as host component 160-N and storage component 140-1. Further details of operations of embodiments of the invention will be explained next with reference to the flow chart of processing steps in FIG. 2 that will be explained in conjunction with the example storage area network architecture 100 illustrated in FIG. 1.

Figure 2:
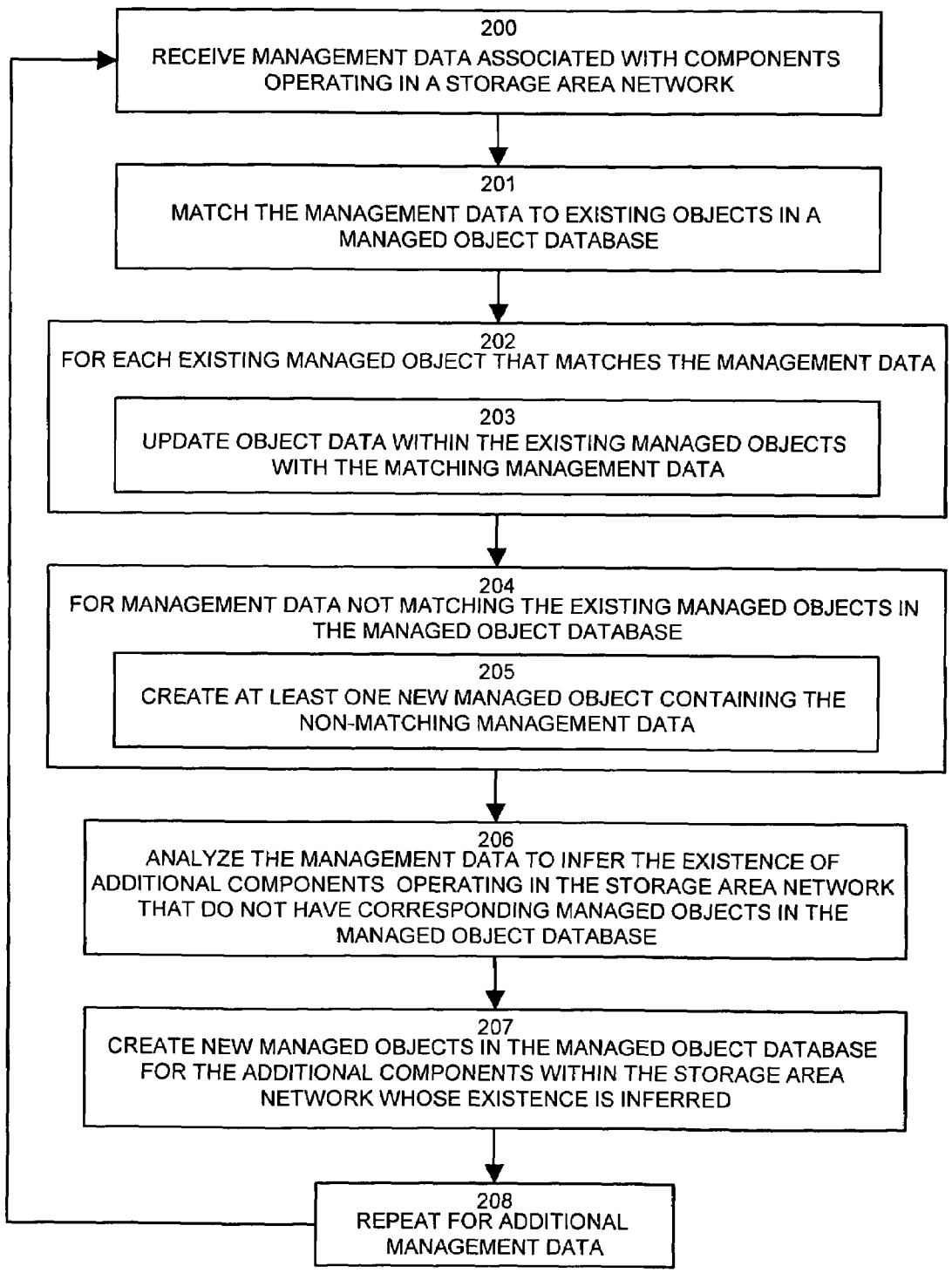
FIG. 2 is a flow chart of example processing operations that an object manager performs according to one example embodiment of the invention.

FIG. 2 is a flow chart of example processing steps that an object manager 120 performs according to one example embodiment of the invention to maintain managed object data associated with example components 140,150 and 160 in the example storage area network 100. Note that the network in which this invention operates need not be a storage area network, but may be any type of computer or communications network.

In step 200, the object manager 120 receives management data 125 associated with components 140, 150 and 160 operating in a storage area network 100. The object manager 120 can receive the management data 125, for example, using a network management protocol such as SNMP.

In step 201, the object manager 120 matches the management data 125 to existing objects 135 in the managed object database 130. Details of one example of such a matching process will be provided shortly. Generally however, the object manager 120 formats the management data 125 into a data structure that is comparable to the existing objects 135 within the managed object database 130 and queries the managed object database 130 to find any existing matching managed objects 135.

Next, in step 202, the object manager 120 enters a processing loop performed for each existing managed object 135 that matches the management data 125 (matched in step 201).

Within the processing loop defined by step 202, in step 203, the object manager 120 updates object data within the existing managed objects 135 with the matching management data 125. In other words, in step 202 and 203, the object manager 120 updates or replaces old or outdated data within the existing managed objects 135 within newly received management data 125 to reflect the current state of a host, connectivity or data storage component 140, 150 or 160 from which that management data 125 was received by transfer from a management agent 180. Further details of this update process as performed according to one embodiment of the invention will be explained shortly.

Next, in step 204, the object manager 120 enters a processing loop performed for portions of management data 125 that did that match any existing managed objects 135 in the managed object database 130. In this example embodiment of the invention, the management data 125 may contain certain portions or sections associated with different individual manageable components within the storage area network 100. As an example, a management agent 180 operating on a host component 160 may collect management data 125 associated with various manageable resources or entities (i.e., manageable components) within the host computer system 160, such as the operating system, different adapters and their associated ports, peripheral devices, and so forth. In addition, the management agent 180 in the host 160-1 may collect management data 125 associated with other components in the storage area network 100 that are not contained within the component (e.g., a host) upon which the management agent 180 operates, such as, for example, the data storage system 140-3 operating within the storage area network 100. As illustrated in the example FIG. 1, the data storage component 140-3 does not operate a respective management agent 180 and as a result, the management agent 180 operating within the host component 160-1 may be responsible for collecting management data 125 associated with this data storage system component 140-3 (i.e., in addition to collecting management data 125 associated with managed resources operating within the host component 160-1 upon which that management agent 180 actually operates). As a result of collecting management data 125 for multiple managed components, the management data 125 may include different portions, fields, regions or sections associated with different managed resources or components within the storage area network 100.

Accordingly, in step 201, the object manager 120 attempts to match portions of the management data 125 to existing objects 135 in the managed object database 130 and in the processing steps 202 and 203, the object manager 120 updates those matching existing objects 135 with corresponding matching management data portions 125. In step 204 however, the object manager performs processing for those portions of the management data 125 that did not currently match existing managed objects 135 in the managed object database 130. Perhaps this was the first time management data 125 had been collected or reported from a component and thus there is not currently a managed object 135 in the database 130 to represent this component (e.g., a device that is just turned on may not have had management data previously collected and sent to the object manager 120).

Within the processing loop defined by step 204, in step 205 the object manager 120 creates at least one new managed object 137 containing the non-matching management data 125 and then stores this new managed object 137 within the managed object database 130. In this manner, as management agents 180 collect management data 125 for various components within the storage area network 100, any management data 125 collected for components that are not yet represented within the existing managed objects 135 in the managed object database 130 are added as new managed objects 137 in steps 204 and 205. After processing of step 205 is complete within the loop defined by step 204, the new managed objects 137 become part of the existing set of managed objects 135. In other words, once the non-matching management data 125 has been placed within a new managed object 137, the new managed object 137 becomes an existing managed object 135.

Next, in step 206 the object manager 120 analyzes the management data 125 to infer the existence of additional components operating in the storage area network 100 that did that have corresponding managed objects in the managed object database 130. In particular, in step 206 the object manager 120 is able to closely analyze or look into the contents and data with the management data 125 to detect references to other components to which the management data 125 itself does not directly relate. That is, the object manager 120 receives, in step 200, management data 125 collected by management agent 180 from specific identifiable managed component resources operating within the storage area network 100 that the management agents 180 are aware. There may be, however, other components operating within the storage area network 100 that are unknown to the management agents 180 and thus no management data is specifically collected for these other components. In step 206, the object manager 120 is able to analyze the management data 125 to detect the existence of these additional components for which the management agents 180 are unaware and thus for which no management data 125 is specifically collected.

As an example, directing attention to the data storage system component 140-2 illustrated in FIG. 1, this data storage system component 140-2 operates, in this example, an inter-component protocol 142-1 between itself and the data storage system component 140-1. The inter-component protocol 142-1 may be a remote data facility maintenance protocol such as the Symmetrix Remote Data Facility (SRDF) system manufactured by EMC Corporation of Hopkinton, Mass. The SRDF protocol and system allows the two data storage systems 140-1 and 140-2 to communicate with each other to allow each to remain in synchronicity with the other in the event of failure of one of the data storage systems. Note also in the illustrated example in FIG. 1 that only the first of these two data storage systems 140-1 operates a management agent 180 to collect management data 125. Accordingly, in this simple example, the management data 125 transferred from the management agent 180 operating in the data storage system component 140-1 only contains management data 125 concerning information and state within the data storage system component 140-1 and not for the data storage system component 140-2.

However, embedded within this management data 125 may be, for example, evidence of operation of the inter-component protocol 142-1. The object manager 120 in step 206 can analyze this management data 125 to detect references or remnants of this protocol 142-1 operating within the first data storage system component 140-1 even though no specific management agent 180 has collected direct management data 125 from this second data storage system component 140-2. Instead, the object manager 120 uses knowledge concerning the operation of the inter-component protocol 142-1 to deduce that the two data storage systems are in communication with each other using the detected protocol.

Next, in step 207, the object manager 120 creates a new managed object 137 in a managed object database 130 for the additional component (e.g., the second data storage system component 140-2) within the storage area network 100 whose existence is inferred. Creation of this managed object can include indicating its relationship via the inter-component protocol with an existing managed object 135 that represents the data storage system components 140-1. In this manner, a network management application configured with the object manager 120 of embodiments of the invention is able to add respective managed objects 135 to the managed object database 130 to represent components within the storage area network 100 that are not actually under management control of the network management application at that moment time and for which the network manager did not inform the network management application about.

After the processing of step 207 is complete, step 208 causes the processing steps 200 to 207 to be repeated such that, over time, managed objects 135 are created for components operating within the storage area network 100 even if they do not have corresponding agents 180 for collection of management data 125. In other words, embodiments of the invention enable the discovery of additional network components in the network 100 which management agents 180 did that indicate to a network management application as existing with specific management data 125 responses, but rather, the object manager 120 discovers these inferred components via analysis of the management data 125 to infer their existence and operation or relation to known components.

Figure 3:
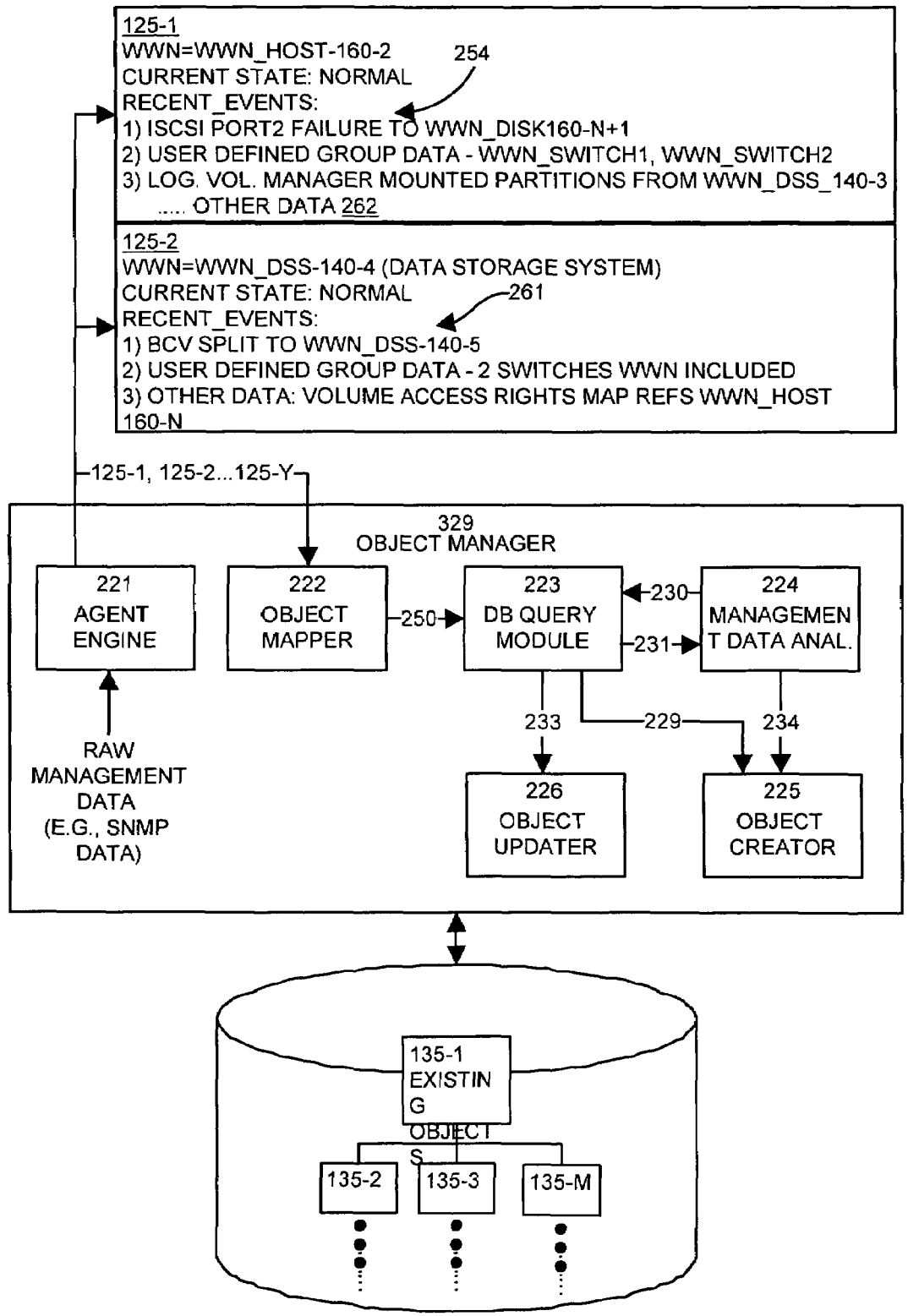
FIG. 3 shows details of an example object manager architecture and management data portions configured according to embodiments of the invention.
Figure 4:
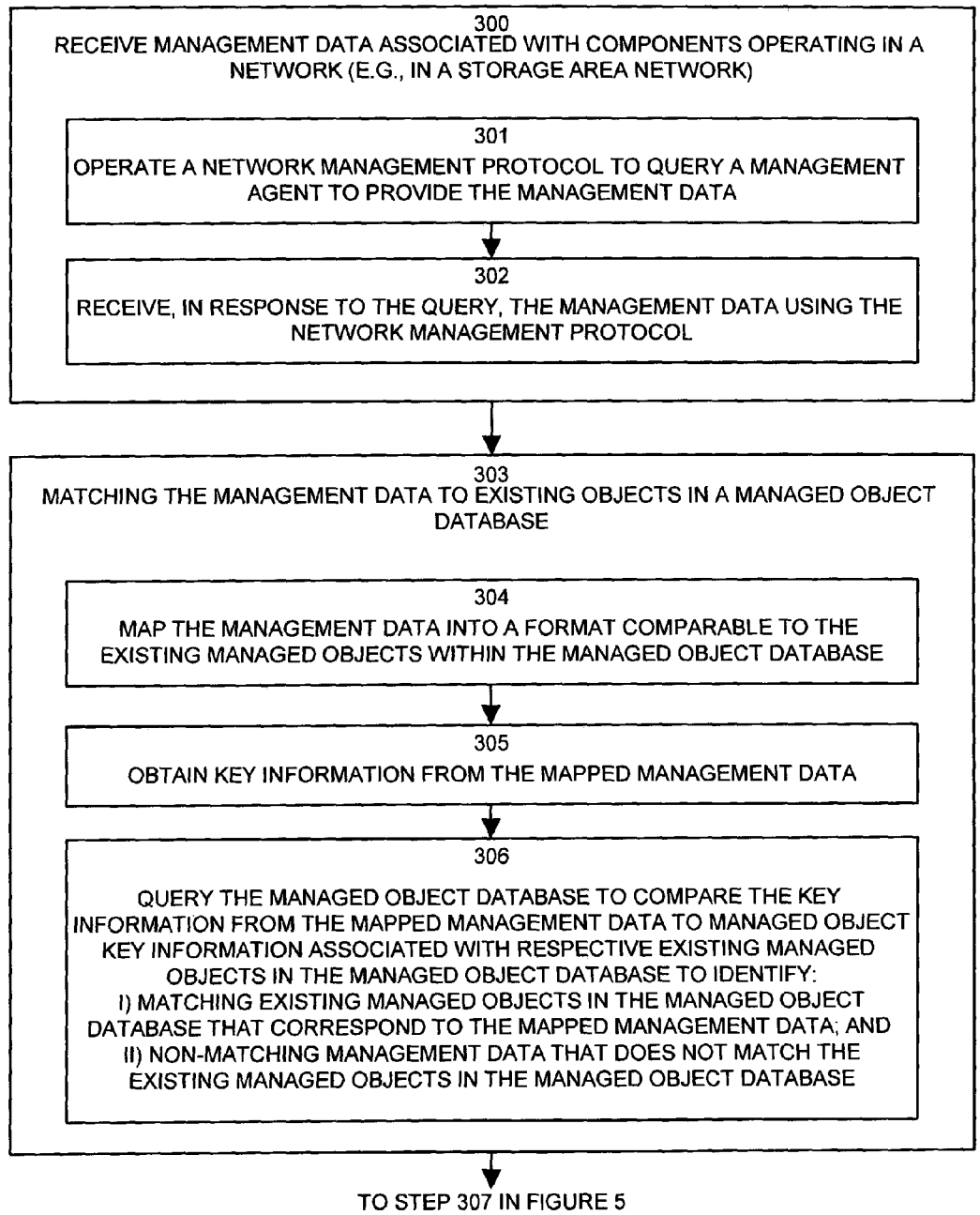
FIGS. 4 through 7 are a flow chart of processing steps that show an example operation of an object manager configured according to various embodiments of the invention.
Figure 5:
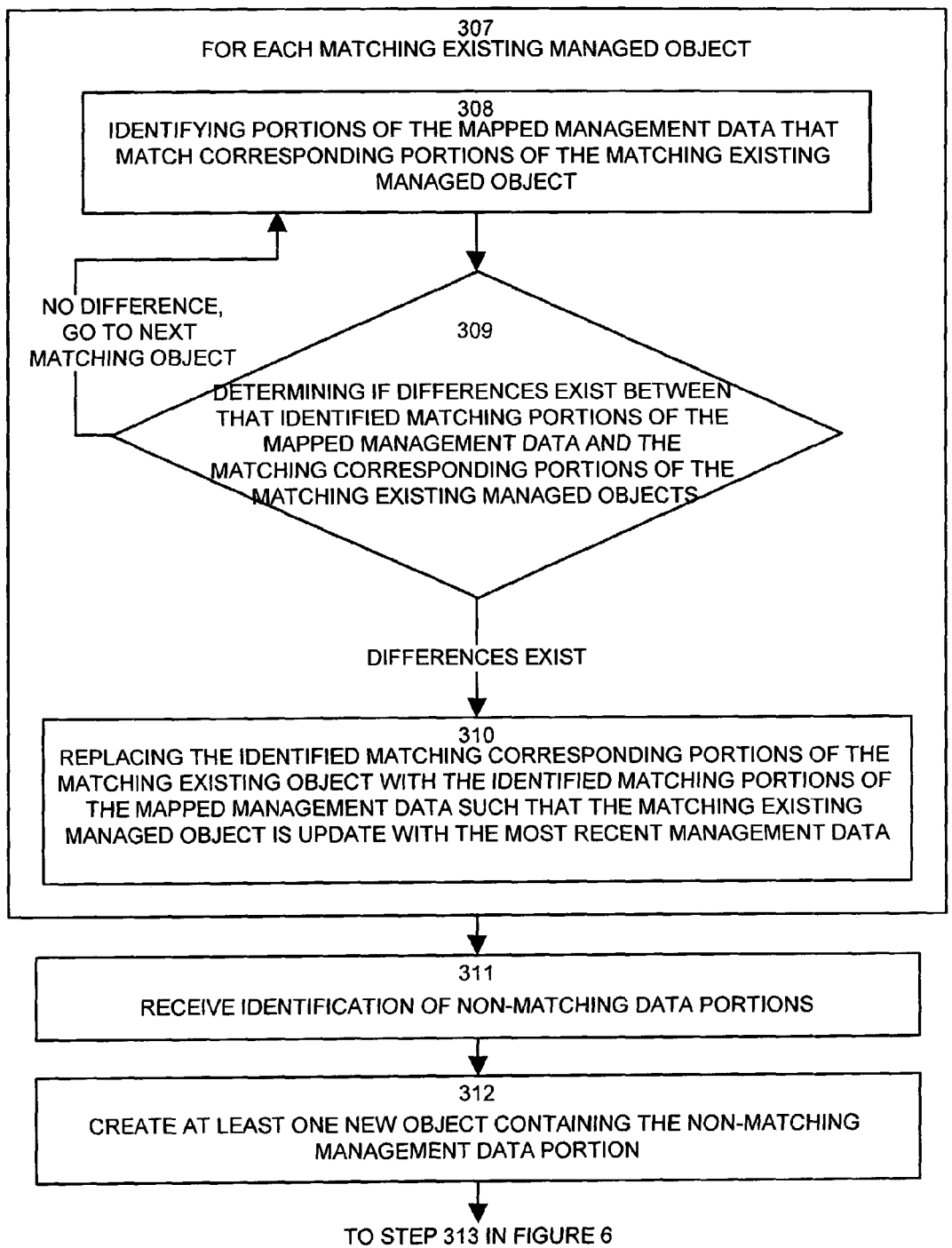
Figure 6:
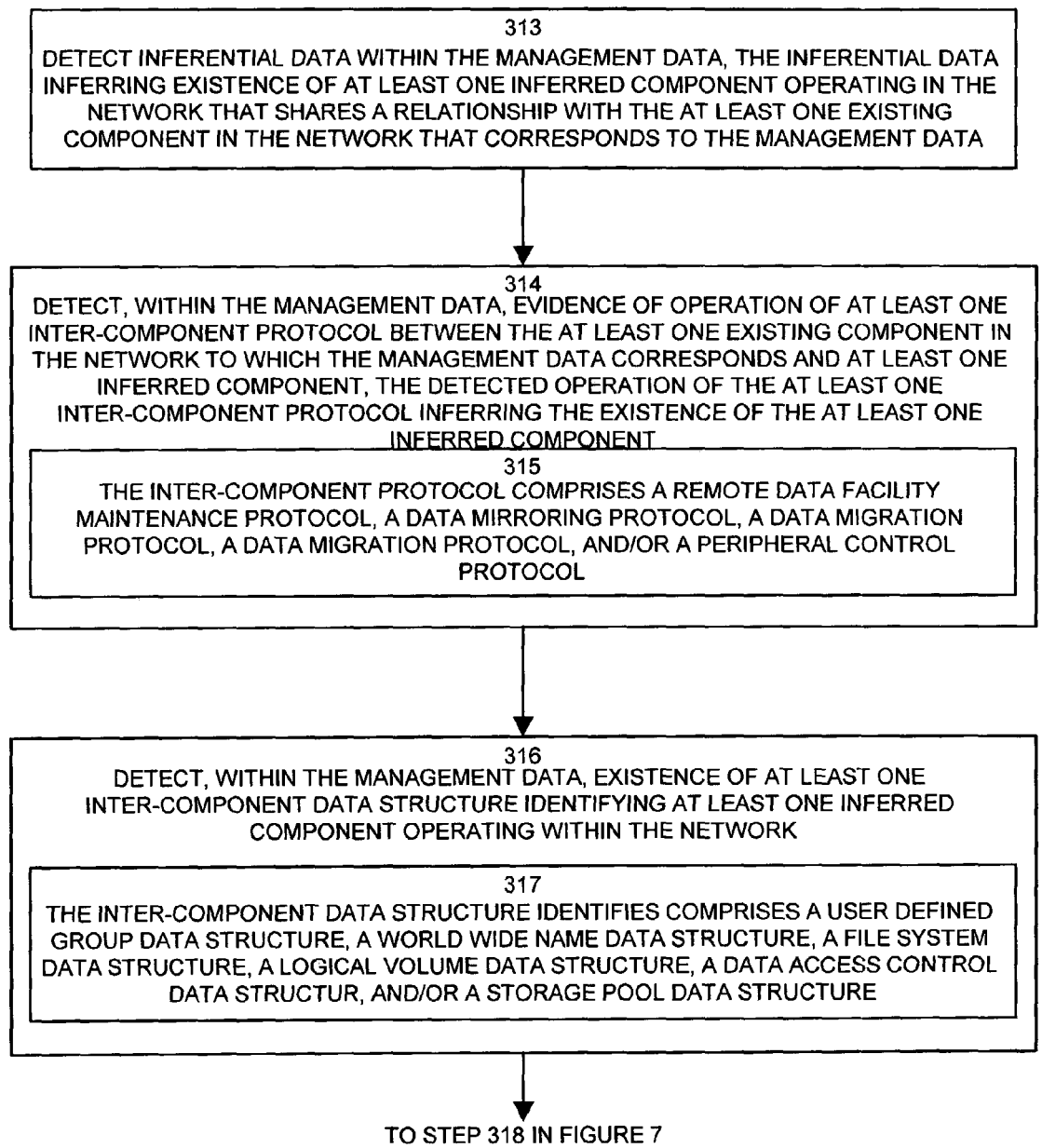
Figure 7:
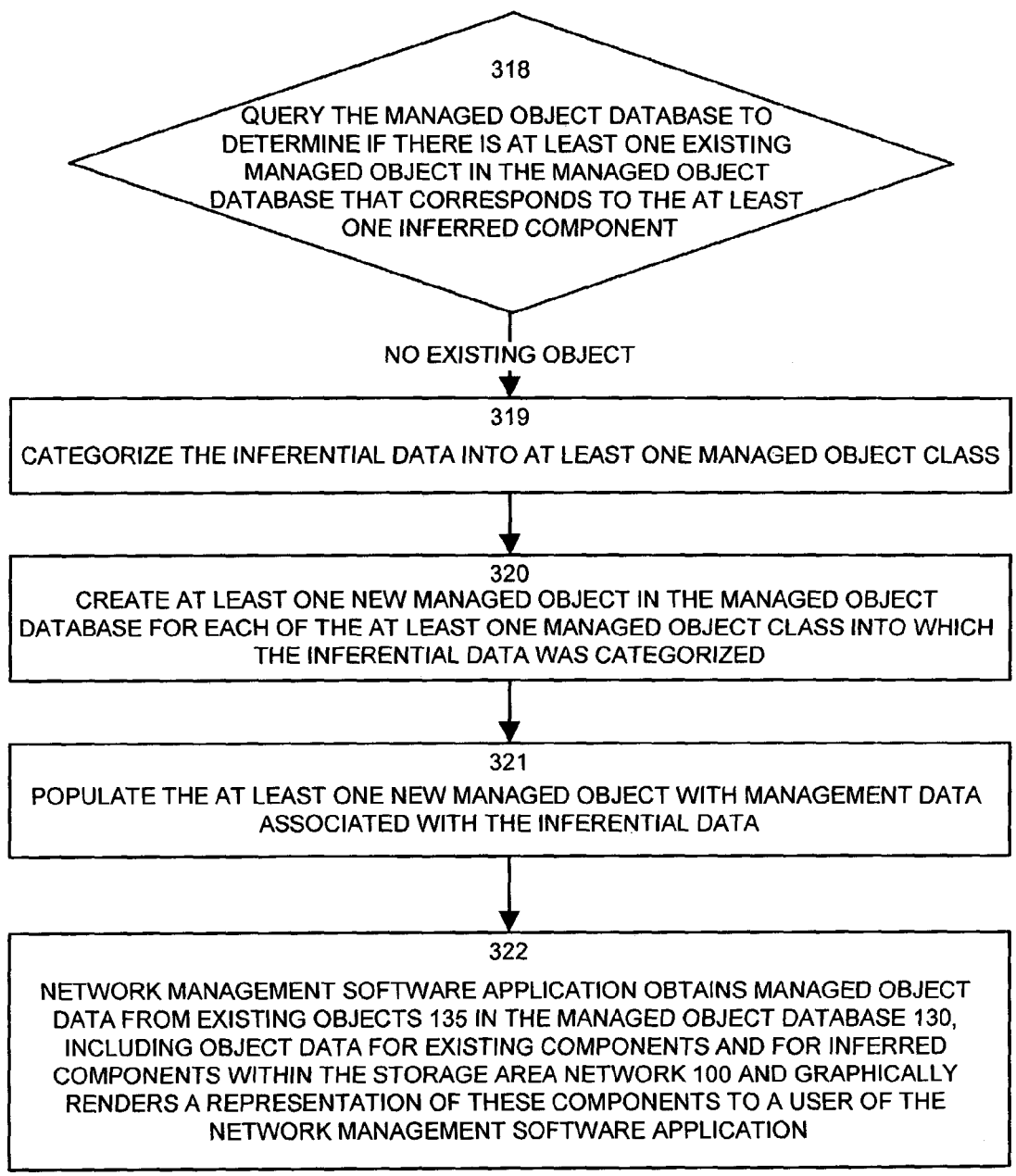

FIG. 3 illustrates details of an exemplary object manager 120 configured in accordance with one example embodiment of the invention. In addition, FIG. 3 illustrates a hypothetical example of example management data 125 that has been formatted by the object manager 120 into a format usable for comparison with existing objects 135 in the database of managed objects 130.

In this example, the object manager 120 includes an agent engine module 321, an object mapper module 222, a database query module 223, a management data analyzer module 224, an object creator module 225 and an object updater module 226. Interoperation of these modules 221 through 226 will be explained in detail below according to example embodiments of the invention. Generally however, the modules 221 through 226 interoperate to perform according to the techniques explained herein. A brief overview of the general operation of each module 221 through 226 will be provided followed by a flow chart of processing steps that illustrates module interoperation according to example embodiments of the invention.

Generally, the agent engine module 221 interacts with the management agents 180 using a network management protocol such as SNMP and receives the management data 125 in a raw or unformatted manner, such as a string of delineated character data received from SNMP queries to one or more management agents 180. The agent engine module 221 passes the raw or unformatted management data 125 to the object mapper module 222 for mapping. The object mapper module 222 formats or maps the raw management data 125 into a format that is comparable with existing objects 135 in the managed object database 130.

As illustrated in this example of FIG. 3, the object mapper module 222 formats the management data 125 in this example into two object classes of mapped management data 125-1 and 125-2. Complete details of the contents of these example mapped management data structures 125-1 and 125-2 will be explained shortly. Generally however, the mapped management data portion 125-1 represents managed data received from the host component 160-2, while the mapped management data portion 125-2 represents managed data received from the data storage system 140-4. During the formatting process, the object mapper module 222 produces or identifies key information 250-1 and 250-2 for each mapped management data portion 125-1 and 125-2.

The database query module 223 receives (e.g., from the object mapper module 222) or obtains (e.g., from the mapped management data 125-1 and 125-2) the key information 250 and queries the managed object database 130 for existing managed objects 135 that match the key information 250. In response, the object updater module 226 receives the set of matching existing managed objects 233 and performs the object updating process explained above with respect to FIG. 2 in step 202 and 203.

After matching the mapped management data 125-1 and 125-2 to any matching existing managed objects 233 identified by the database query module 223, the object updater module 226 provides any leftover non-matching management data 229 (management data portions that did not have corresponding existing objects 135) to the object creator module 225. The object creator module 225 thus creates new managed objects (137 in FIG. 1) to be included within the managed object database 130 for these un-matched mapped management data portions 125. In this manner, as the object manager 120 encounters new management data 125 for components that have not yet been "seen", the object creator module 225 can add objects to the managed object database to represent these components and can populate these new objects with the appropriate corresponding mapped management data portion 125.

The management data analyzer 224 also has access to the mapped management data 125-1 and 125-2 and performs an analysis process as will be explained to discover or infer references within this data 125 to other components (referred to herein as inferred components) operating or existing within the network 100 for which management data 125 has not been specifically received. Upon detecting a reference to such an additional or inferred component, the management data analyzer module 224 can query 230 the database query module 223 in order to determine if a managed object 135 already exists that corresponds to the inferred component. If the response 231 indicates that there is no existing managed object 135 corresponding to the inferred component, the management data analyzer module 224 passes inferential data 234 concerning the newly discovered or inferred component to the object creator module 225 for creation of new managed objects 137 to represent this new component within the network 100. In this manner, the object manager 120 configured according to this example embodiment of the invention is able to create managed objects within the managed object database 130 based upon inferential references to other components operating within the storage area network 100 for which management agents 180 have not specifically collected management data 125.

In this manner, as the object manager 120 encounters more and more management data 125 reported from management agents 180 concerning different managed components and different management events for these components within a network 100 such as a storage area network, embodiments of the invention cause the managed object database 130 to continually grow with more and more managed objects 135 representing these managed components. In addition to adding existing objects associated with specific collected management data 125 to the managed object database 130, embodiments of the invention are able to analyze the management data 125 after its receipt in an attempt to discover references, such as event occurrences that indicate the existence of additional components operating within the network 100 for which the management data 125 is not specifically collected but which their existence and operation in the network 100 is inferred from the analysis of the management data 125.

Embodiments of the invention can thus discover other data storage systems, host computer systems, connectivity devices, peripheral devices, remote computers, data communications devices, different data paths between components, and the like within the storage area network 100 for which management agents 180 are not currently collecting or have not yet currently provided management data 125, but which exist and operate nonetheless within the network 100. Since the object manager 120 infers existence of, and hence operation of these objects within the network 100 based on references to these components with the management data in relation to known components, embodiments of the invention allow for the discovery of additional components within the network and thus can create a managed object model of existing objects 135 within the managed object database 130 that more accurately reflects the exact composition and configuration of network components even though management data has had been specifically collected for all these components.

Further details of processing operations performed by the object manager 120 shown in FIG. 3 and details of the management data structures 125-1 and 125-2 will be explained next with respect to the flow chart of processing steps shown in FIGS. 4 through 7.

FIGS. 4 through 7 are a continuous flow chart of processing steps and operations that the object manager 120 performs according to one example embodiment of the invention to collect, maintain and develop managed object data associated with components in a network 100, such as a storage area network.

In step 300, the agent engine module 221 operating in the object manager 120 receives management data 125 associated with one or more components operating in a storage area network 100. Details of processing step 300 are shown in this example in sub-steps 301 and 302.

In step 301 the agent engine module 221 operating network management protocol such as SNMP or another protocol queries management agents to provide the management data 125.

In step 302 the agent engine module 221 receives, in response to the query(s), the management data 125 using the network management protocol. The management data 125 received in this manner may be in a raw or native format compatible with the network management protocol. As an example, the management data 125 may be a long ASCII string of character data.

Next, in step 303 the object never module 222 matches the management data 125 to existing objects 135 in the managed object database 130. Details of this matching process are explained in this example embodiment with respect to sub-steps 304 through 306.

In step 304, and the object mapper module 222 maps the management data 125 into a format comparable to the existing managed objects 135 within the managed object database 130. In particular, as illustrated in FIG. 3 the object mapper module 222 parses the raw management data 125 into specific portions, fields or records of mapped management data 125-1 and 125-2. Each portion of mapped management data 125-1 and 125-2 includes corresponding a portion of respective key information 250. The key information 250 for a management data portion provides a unique identification of the network component to which this particular management data portion 125-1 or 125-2 relates (i.e., was collected from). In other words, the key information 250 allows association of this portion of management data 125 to a specific components operating within the storage area network 100.

In addition to containing key information 250, each portion of management data includes component state information indicating such things as, in this example, recent events 255 and 261 associated with the respective components corresponding to that portion of mapped management data 125 and other data 262 related to operation of the component to which that management data is associated. In other words, the management data 125 can indicate recent management events that have occurred within the components associated with respective portions of management data 125 and can also contained other data related to these components as well. Perhaps that other data is reported to the network management application operating the object manager 120 on a periodic basis to verify proper configuration of that component. It is to be understood that the example illustrated in FIG. 3 is a simplified example of hypothetical management data 125 and is not intended to be limiting to embodiments of the present invention. After mapping the management data is complete in step 304, processing proceeds to step 305.

In step 305, the database query module 223 obtains the key information 250 from the mapped management data 125-1 and 125-2. The key information 250 in this example contains worldwide name (WWN) information regarding the specific component operating in the network 100 to which this portion of mapped management data 125-1 or 125-2 relates. In other words, the key information 250 uniquely identifies the component for which this management data 125 was collected.

In step 306, the database query module 223 queries the managed object database 130 to compare the key information 250 from the mapped management data portions 125-1 and 125-2 to managed object key information 2650 associated with respective existing managed objects 135 in a managed object database 130 in order to identify a set of matching existing managed objects 135 (shown by arrow 233 in FIG. 3) in the managed object database that corresponds to the mapped management data portions 125-1 and 125-2. In addition, in step 306, the database query module 223 can identify non-matching management data portions 229 (FIG. 3) that do not match existing managed objects 135 in a managed object database 130. In other words, in step 306, the database query module 223 uses the key information 250 to determine which existing managed objects 135 in the managed object database 130 corresponds to the various portions of match mapped management data 125.

It may be the case that certain portions of mapped management data 125-X do not have any corresponding existing managed objects 135 established within the managed object database 130. As an example of such an occurrence, perhaps this is the first time that management data 125 has been collected for a particular component within the storage area network and hence there might be no existing managed object 135 yet established or created for this component. Upon completion of the processing of step 306, the database query module 223 passes the resultant set of the matching existing managed objects 233 to the object updater module 226.

In step 307 the object updater module 226 enters a processing loop that it is performed for each matching existing managed object 135 defined within the set of matching existing managed objects 233.

In step 308, the object updater module 226 identifies portions of the mapped management data 125-1 or 125-2 that match corresponding portions of the matching existing managed objects 135. In other words, in step 308 the object updater module 226 determines which portions of the mapped management data 125 correspond to which portions of the matching existing managed objects 135 in the set of matching existing managed objects 233.

Next, in step 309 the object updater module 226 determines if differences exist between the identified matching portions of the mapped management data 125 and the matching corresponding portions of the matching existing managed objects 135. If differences exist, then the management state of a component corresponding to this managed object 135 has changed and needs to be saved and thus processing proceeds to step 310. Note that if no differences exist from the management data portion 125 and the matching existing object 135, then no update needs to occur and processing continues for the next matching managed object.

In step 310 (entered if differences exist between the management data and the managed object to which this data corresponds) the object updater module 226 replaces the identified matching corresponding portions of the matching existing object 135 with the identified matching portions of the mapped management data 125-1 or 125-2 such that the existing matching managed object is updated with the most recent management data.

In other words, in the processing loop defined by step 307, the object updater module 226 identifies within the matching existing managed objects 135, what parameters, data definitions, fields, or other records within this data structure match corresponding information within the mapped management data portions 125 that corresponds to this existing managed object 135 and then in step 309 if differences exist between these corresponding data structures, processing proceeds to step 310 at which point the object updater module 226 replaces the old information within the existing managed object 135 with the new management data information in order to provide the most up-to-date management data within the existing managed object 135 corresponding to that component. In this manner, embodiments of the invention cause the set 233 of existing managed objects 135 to be updated with the most up-to-date management information only in situations where differences exist between the current collected management information data 125 and management data already stored within the existing managed objects 135. Accordingly, if no differences exist from the management data 125 to the data already stored within the existing managed objects 135, no update is performed in order to conserve processing cycles.

After the processing loop defined by step 307 is complete, the set of existing managed objects 233 that corresponds to any of the mapped management data portions 125-1 and 125-2 is now updated with the most recent or up-to-date management data and processing proceeds to step 311.

In step 311 the object creator module 225 receives the identification of non-matching management data portions 229. The identification of non-matching management data portions 225 contains the identity of any mapped management data portions 125-1 or 125-2 that did not correspond to any existing managed objects 135 within the managed object database 130. In the illustrated example in FIG. 3, only two mapped management data portions 125-1 and 125-2 are shown in this simplified example. Using this example, suppose that during the processing of step 306, the database query module 223 only identified a set of matching existing managed objects 233 that corresponded only to the first portion of mapped management data 125-1 and thus there were no existing managed objects 135 currently present in the managed object database 130 that corresponded to the key information 250-2 associated with the second portion of mapped management data 125-2. This may occur, for example, in situations where a management agent 180 for the first time collects management data 125. Accordingly, the network management application operating object manager 120 may not yet have created in existing managed object 135 to represent this component within the managed object database 130. Accordingly, since there is no matching existing managed object 135 in the database corresponding to the key information 250-2 associated with this portion of mapped management data 125-2 (in this hypothetical example), the identity of the non-matching management data portions 229 is provided to the object creator module 225 for creation of new managed objects (137 in FIG. 1) within the managed object database 130.

In step 312 the object creator module 225 creates at least one new managed object (e.g., 137 in FIG. 1) containing the non-matching management data portion 125-2. In this manner, embodiments of the invention can dynamically and automatically create new managed objects which are added to the set of existing managed objects 135 as more and more management data is received for these new components as they begin to operate in the storage area network 100. This allows embodiments of the invention to dynamically adapt to changing network conditions such as the addition of new components within the network for which management agents 180 begin to collect management data 125. Accordingly, as management data 125 arrives at the object manager 125 that has never been "seen" or encountered before from new components added to the network, embodiments of the invention are capable of creating, without user intervention, new managed objects to represent these new components operating within the network 100.

Next, in step 313 the management data analyzer 224 operates to detect inferential data 234 within the management data portions 125. The inferential data 234 as will be explained allows the inferred existence of at least one inferred component operating in the storage area network 100 that shares a relationship with an existing component in the storage area network 100 that corresponds to the collected management data 125. In this example embodiment of the invention, sub-steps 314 through 317 explained example mechanisms for detecting inferential data 234 within the management data 125 collected by management agents 180.

In particular, in step 314 the management data analyzer module 224 detects, within the management data portions 125-1 and 125-2, evidence of operation of at least one inter-component protocol operating between the existing component in a storage area network to which a management data portion 125 corresponds and at least one inferred component. In other words, the detected operation of the inter-component protocol infers the existence of the inferred component because the inter-component protocol would not otherwise be in existence would it not be for the presence and operation of the inferred component.

Sub-step 315 indicates that in this example embodiment the inter-component protocol operates between the existing component in a storage area network to which the management data portion 125 corresponds and at least one other inferred component and can include protocols such as a remote data facility maintenance protocol (e.g., SRDF), a data mirroring protocol, a data migration protocol, and peripheral control protocol. In these examples then, any type of protocol that operates between two components in the network and for which some operation or indication of the existence of this protocol is present within the management data 125 for a known component or existing component having an existing managed object 135 in a database, allows the management data analyzer module 224 to infer the existence of the other component in the network 100.

As an example, referring to the storage area network 100 FIG. 1, two inter-component protocols 142-1 and 142-2 are illustrated as operating between data storage system pairs 140-1, 140-2 and 140-4, 140-5, respectively. These inter-component protocols 142 may have associated data structures, values or other information referenced, contained or otherwise indicated within the management data 125. The object manager 120 only collected the management data 125 however from one of the data storage systems 140-1 and 140-4 and thus without the analysis operation in this step, would not otherwise know of the existence of this other data storage system 140-2, or 140-5. However, as a result of the existence of information within the mapped management data portions 125 that indicates the existence of such inter-component protocols, the management data analyzer module 224 can detect this information as the inferential data 344 in order to infer the existence of the second data storage system component 140-2 and/or 140-5 operating within the storage area network 100, even though the object manager 120 did not specifically collect management data 125 for these respective second data storage system components 140-2 and 140-5.

Directing attention to the example mapped management data portions 125-1 and 125-2, various illustrated examples exist of inferential data within these management data portions 125 that the management data analyzer 224 may detect so as to infer the existence of other components operating within the storage area network, but to which these particular mapped management data portions 125 do not specifically relate. As an example, within the mapped management data portion 125-1, recent event data 254 indicates that a SCSI port within the host component 160-2 suffered a failure or error when communicating with a disk drive device component having a worldwide name "WWN_DISK 160-N+1." In this example then, this recent event data 254 indicates operation of an inter-component protocol which in this example is a SCSI protocol operating between the host component 160-2 to which this mapped management data portion 125-1 specifically relates and another component which is a disk drive component coupled via SCSI protocol operation (and hence a connection) to this host component 160-2. The disk drive component has a worldwide name as indicated above which allows the management data analyzer module 224 to uniquely identify this newly discovered component based upon the existence of the event data related to the inter-component SCSI protocol operating between the host component 162 and this disk drive component (presumably operating within the host computer system 160-2). This example thus illustrates how the management data analyzer 224 can discover inferred components from detection of operation of inter-component protocols that in this example is a peripheral control protocol.

Directing attention to the mapped management data portion 125-2, this mapped management data portion 125-2 corresponds to management data collected by a management agent 180 from the data storage system component 140-4. Note that within this mapped management data portion 125-2, recent event data 261 indicates that a business continuance volume split has recently occurred between the data storage system component 140-4 and another data storage system component 140-5. The management data analyzer module 224 can review this recent event information 261 and can identify the existence of the second data storage system component 140-5 based on its reference within the event data related to the inter-component protocol used to maintain business continuance volumes (business continuance volumes protocols are a software product manufactured by EMC Corporation of Hopkinton, Mass.). This example thus illustrates another example of how the object manager 120 configured according to embodiments of the invention can analyze the management data to infer existence of additional components operating in a storage area network.

In sub-step 316, the management data analyzer module 224 is able to infer the existence of additional components operating a storage area network by detecting, within the management data portions 125, the existence of at least one inter-component data structure identifying at least one inferred components operating within the storage area network. In this embodiment of the invention then, the management data analyzer 224 is also able to analyze data structures within the mapped management data portions 125 that reference other components operating in the network 100 to identify these other references.

As shown in sub-step 317 examples of inter-component data structures that may be used to identify the existence of other inferred components within data fields within these data structures include user-defined group data structures (e.g., groups of components defined by users), worldwide name data structures, file system data structures, logical volume data structures, access control data structures and/or storage pool data structures. It is to be understood that these data structures are provided in this embodiment of the invention by way of example only and are not intended to be limiting of embodiments of the invention. Accordingly, using the processing disclosed in steps 316 and 317, the management data analyzer module 224 is able to look into the contents of the mapped management data portions 125-1 and 125-2 in order to review data structures contained within this information for references to identities of other components operating within the storage area network.

As an example of processing performed in steps 316 and 317 with respect to the example mapped management data portions 125-1 and 125-2 shown in FIG. 3, recent event data 225 within management data portion 125-1 indicates the existence within the host component 162 of a user defined group data structure that identifies two additional connectivity switch components (not shown in the example in FIG. 1). The management data analyzer 224 can thus infer the existence of these two other switches. As another example, recent event data 256 in this same management data 125-1 indicates that logical volume manager software operating on the host component 160-2 has recently mounted partitions of disk drives from a data storage system having a worldwide name "WWN_DATA STORAGE SYSTEM 140-3." Accordingly, since the logical volume manager accesses disk partitions in a data storage system having this worldwide name, the management data analyzer module 224 can infer the existence of this data storage system and of disk drive components contained within this data storage system.

Directing attention to the example mapped management data portion 125-2, other data 262 referenced therein indicates information related to a volume access rights map containing a reference to a host component having a worldwide name "WWN_HOST 160-N." Detecting this reference allows the management data analyzer module 224 to infer the existence of this additional host component. As illustrated FIG. 1, the host component 160-N does not have a respective management agent 180 operating therein. However, due to the operations of embodiments of the invention as explained up to this point, the management data analyzer module 224 is able to detect the presence of this host computer system 160-N even though no management data portions 125 have been specifically collected from management agent 180 operating in conjunction with this host component 160-N.

After the processing of step 313 and sub-steps 314 through 317 is complete the object manager 120 has detected inferential data such as the identities of specific components referenced within the management data 125.

Next, in step 318 the management data analyzer module 224 queries 230 the managed object database 130 (using a database query module 223 in the example of FIG. 3) to determine if there is at least one existing managed object 135 in the managed object database 130 that corresponds to the inferred components. In other words, in step 318, after detecting inferential data within the management data (in step 313) the management data analyzer module 224 checks to see if there are already existing managed objects 135 within the managed object database 130 that represent components associated with these inferred components. This query processing can use, for example, the worldwide name identity or other inferential data as key information to query the database 130 to determine if existing objects 135 match this worldwide name key information or other inferential data. If there are no existing managed objects 135 in the managed object database 130 that correspond to the inferred components (i.e., if the query returns null indicating that no existing managed objects 135 had matching worldwide names that matched the inferential data detected within the management data), processing proceeds to steps 319 through 321. However, in step 318 if managed objects 135 already existent that correspond to the inferential data, processing is complete and the object manager 120 does not need to create new objects for the inferential data discovered within the management data 125.

In step 319, the object creator module 225 receives the inferential data 234 (for those components that do not have corresponding existing objects 135 already created) from the management data analyzer module 224 and categorizes the inferential data 234 into at least one managed object class. As an example, if the inferential data 234 is worldwide name information concerning a newly discovered component operating within the network 100, the object creator module 225 can parse the worldwide name of this newly discovered component to determine the specific characteristics of the component and thus determine a data structure class to be used to create an object for this component. This is because, in this example, worldwide name information can indicate a unique identifier for a component in a network and can further indicate some information concerning what type of component is associated with that worldwide name or unique identifier. Accordingly, if the worldwide name discovered within the management data as inferential data 234 in step 313 is associated with a data storage system, then in step 319 the object creator module 225 can select a data storage system class to be used to create a managed object to represent this newly discovered component. Likewise, if worldwide name information contained within the inferential data 234 indicates or corresponds with a category of host computer systems or connectivity devices, the object creator module 225 in step 319 can categorize the inferential data 234 into appropriate host or connectivity device classes. Once the inferential data 234 is categorized into an appropriate class, processing proceeds to step 320.

In step 320 the object creator module 225 creates at least one new managed object (137 in FIG. 1) in a managed object database 130 for each managed object class into which the inferential data 234 was categorized in step 319. In other words, in step 320 the object creator module 225 instantiates an object within the managed object database 130 to represent each component identified and categorized by the inferential data 234.

With reference to the aforementioned examples illustrated in the mapped management data portions 125-1 and 125-2 (discussed above with respect to detecting the inferential data 234 in step 313), the object creator module 225 in step 320 can create new managed objects 137 corresponding to the data storage system component 140-3, a disk drive component within the host component 162, a host component 160-N, and the data storage system component 140-5. In other words, in step 320, for each of the four new components for which inferential data was identified, discovered or detected in step 313, the object creator module 225 creates a new managed object 137 respectively representing each inferred component.

Next, in step 321 the object creator module 225 populates each new managed object with management data 125 associated with the inferential data. Accordingly, in step 321 the object creator module 225 provides, into the new object 137, as much information as may be obtained from analysis of the mapped management data portions 125 containing the inferential data 234 concerning the existence of the new inferred components. This information may be limited to simply the worldwide name of the component or, alternatively, may include other information derived from details existing within management data portions 125 containing the inferred data 234.

In this manner, embodiments of the invention are able to analyze management data received from management agent 180 and are able to infer the existence of other components whose existence is either referenced or otherwise inferable by information contained within the management data 125. In this manner, the invention can model components operating within the storage area network 100 that are not specifically under management control of the management agent 180 or are not specifically producing management data 125. Embodiments of the invention can still detect their existence and can create objects 137 in the managed object database 130 to represent these components thus producing a more complete and accurate representation of the various entities existing within a storage area network 100.

In step 322, a network management software application obtains managed object data from existing objects 135 in the managed object database 130, including object data for existing components and for inferred components within the storage area network 100 and graphically renders a representation of these components to a user of the network management software application. In this manner, embodiments of the invention can present a representation of inferred components as well as existing components to a user of the network management software to allow that user, such as a network manager, to view a more accurate and complete representation of the network.

Those skilled in the art will understand that there can be many other variations made to the operations of the embodiments explained above while still achieving the same objectives of the invention. As an example, variation in the order of processing operations may be made while still achieving the same results as explained herein. Such variations are intended to be covered by the scope of this invention. As such, the foregoing description of embodiments of the invention are not intended to be limiting. Rather, any limitations to embodiments of the invention are presented in the following claims.

What is claimed is:

1. A method for maintaining a database of manageable entities in a storage area network, the database operable to store network component data pertaining to network components defining manageable entities in the storage area network:

receiving management data associated with existing components operating in a network;

matching the management data to existing objects in a managed object database;

updating management data pertaining to existing manageable entities in the storage area network, each of the components further comprising a manageable entity responsive to a SAN management application in the storage area network, updating further comprising, for each existing managed object that matches the management data, updating object data within the existing managed objects with the matching management data;

for management data not matching the existing managed objects in the managed object database, creating at least one new managed object containing the non-matching management data;

analyzing the management data to infer an existence of additional components operating in the network that do not have corresponding managed objects in the managed object database;

detecting, within the management data, evidence of operation of at least one inter-component protocol;

detecting inferential data within the management data, the inferential data inferring existence of at least one inferred component operating in the network that shares a relationship with an existing component in the network that corresponds to the management data; and creating new managed objects in the managed object database for components within the network whose existence is inferred, wherein the inferential data infers the existence of at least one of a host component, a connectivity component and a storage device component operating within the network that the managed object database does not currently represent with an existing management object, the inferred manageable entities corresponding to a synchronicity protocol, the synchronicity protocol operable to maintain recoverability in the event of failure of a manageable entity conversant with another manageable entity via the synchronicity protocol.

2. The method of claim 1 wherein matching the management data to existing objects in the managed object database comprises:

mapping the management data into a format comparable to the existing managed objects within the managed object database;

obtaining key information from the mapped management data; and querying the managed object database to compare the key information from the mapped management data to managed object key information associated with respective existing managed objects in the managed object database to identify:

i) matching existing managed objects in the managed object database that correspond to the mapped management data; and ii) non-matching management data that does not match the existing managed objects in the managed object database.

3. The method of claim 2 wherein updating object data within the existing managed object with the matching management data comprises:

for each matching existing managed object:

identifying portions of the mapped management data that match corresponding portions of the matching existing managed object; and determining if differences exist between that identified matching portions of the mapped management data and the matching corresponding portions of the matching existing managed objects, and if difference exist, replacing the identified matching corresponding portions of the matching existing object with the identified matching portions of the mapped management data such that the matching existing managed object is updated with the most recent management data.

4. The method of claim 3 wherein the management data corresponds to at least one existing manageable entity within the network; and identifying new manageable entities referenced in the management data; and inferring additional manageable entities from the identified and existing manageable entities, the additional manageable entities inferred from network component information in the management data indicative of operation the inferred manageable entities, wherein analyzing the management data to infer an existence of additional components operating in the network comprises:

detecting inferential data within the management data, the inferential data inferring existence of at least one inferred component operating in the network that shares a relationship with the at least one existing component in the network that corresponds to the management data;

querying the managed object database to determine if there is at least one existing managed object in the managed object database that corresponds to the at least one inferred component, and if there is not at least one existing managed object in the managed object database that corresponds to the at least one inferred component:

categorizing the inferential data into at least one managed object class; and wherein creating new managed objects in the managed object database for components within the network whose existence is inferred comprises:

creating at least one new managed object in the managed object database for each of the at least one managed object class into which the inferential data was categorized; and populating the at least one new managed object with management data associated with the inferential data.

5. The method of claim 4 wherein detecting the inferential data within the management data further comprises:

detecting the evidence of operation of the at least one inter-component protocol between the at least one existing component in the network to which the management data corresponds and at least one inferred component, the detected operation of the at least one inter-component protocol inferring the existence of the at least one inferred component.

6. The method of claim 5 wherein the at least one inter-component protocol operates between the existing component in the network to which the management data corresponds and the at least one inferred component and comprises at least one of:

i) a remote data facility maintenance protocol;
ii) a data mirroring protocol;
iii) a data migration protocol; and
iv) a peripheral control protocol.

7. The method of claim 4 wherein the management data includes data structures having references to identities of other components operating in the storage area network, and detecting inferential data within the management data comprises:

detecting, within the management data, existence of at least one inter-component data structure identifying at least one inferred component operating within the network.

8. The method of claim 7 wherein the at least one inter-component data structure identifies existence of the at least one inferred component within at least one data field within the inter-component data structure; and wherein the inter-component data structure comprises at least one of:

i) a user defined group data structure;
ii) a world wide name data structure;
iii) a file system data structure;
ivii) a logical volume data structure;
v) a data access control data structure; and
vi) a storage pool data structure.

9. The method of claim 4 wherein the inferential data infers the existence of at least one of a host component, a connectivity component and a storage device component operating within the network that the managed object database does not currently represent with an existing management object, the inferred manageable entities corresponding to a synchronicity protocol, the synchronicity protocol operable to maintain recoverability in the event of failure of a manageable entity conversant with another manageable entity via the synchronicity protocol.

10. The method of claim 1 comprising repeating receiving management data, matching the management data, updating object data, creating at least one new managed object, analyzing the management data and creating new managed objects for components whose existence is inferred, such that over time, managed objects are created for components operating within the network that do not have corresponding agents for collection of management data, the inferred manageable entities corresponding to a synchronicity protocol, the synchronicity protocol operable to maintain recoverability in the event of failure of a manageable entity conversant with another manageable entity via the synchronicity protocol.

11. The method of claim 1 wherein receiving management data comprises:
    operating a network management protocol to query a management agent to provide the management data; and
    receiving, in response to the query, the management data using the network management protocol.

12. A method for maintaining managed object data for components within a network, the method comprising:
    receiving a set of management data associated with existing components operating in a network, the management data corresponding to at least one of a protocol, data structure, network name and event exchanged between manageable entities in the storage area network;
    obtaining key information from the set of management data;
    matching the key information to existing objects in a managed object database;
    for each existing managed object having matching key information, updating object data within the existing managed object with the management data associated with the matching key information from the set of management data;
    inferring, from the management information sent by a storage device in a storage array component, an additional component from key information indicative of a name of the inferred component;
for key information not matching any managed object in the managed object database, analyzing the non-matching management data associated with this key information not matching any managed object to infer the existence of additional components operating in the network that do not have corresponding managed objects in the managed object database; and
    creating new managed objects in the managed object database for components within the network whose existence is inferred, wherein inferring from the management information infers the existence of at least one of a host component, a connectivity component and a storage device component operating within the network that the managed object database does not currently represent with an existing management object, the inferred manageable entities corresponding to a synchronicity protocol, the synchronicity protocol operable to maintain recoverability in the event of failure of a manageable entity conversant with another manageable entity via the synchronicity protocol.

13. A computer system, comprising:
    a memory system;
    a processor;
    an interface coupled to a storage area network (SAN);
    a managed object database; and
    an interconnection mechanism connecting the processor, the memory system, the interface and the managed object database;
    wherein the memory system is encoded with a SAN management application that when performed on the processor, produces a object manager process that maintains managed object data associated with components in a network, the object manager performing:
    receiving, over the interface into the memory system, management data associated with existing components operating in a network;
    matching the management data to existing objects in the managed object database;
    for each existing managed object that matches the management data, updating object data within the existing managed objects with the matching management data;
    for management data not matching the existing managed objects in the managed object database, creating at least one new managed object containing the non-matching management data;
    analyzing the management data to infer an existence of additional components operating in the network that do not have corresponding managed objects in the managed object database;
    identifying new components referenced in the management data;
    inferring additional components from the identified and existing components, the additional components inferred from network component information in the management data indicative of operation the inferred components;
    detecting, within the management data, evidence of operation of at least one inter-component protocol;
    detecting inferential data within the management data, the inferential data inferring existence of at least one inferred component operating in the network that shares a relationship with an existing component in the network that corresponds to the management data; and
    creating new managed objects in the managed object database for components within the network whose existence is inferred, wherein the inferential data infers the existence of at least one of a host component, a connectivity component and a storage device component operating within the network that the managed object database does not currently represent with an existing management object, the inferred manageable entities corresponding to a synchronicity protocol, the synchronicity protocol operable to maintain recoverability in the event of failure of a manageable entity conversant with another manageable entity via the synchronicity protocol.

14. The computer system of claim 13 wherein matching the management data to existing objects in the managed object database comprises:
    mapping the management data into a format comparable to the existing managed objects within the managed object database;
    obtaining key information from the mapped management data; and
    querying the managed object database to compare the key information from the mapped management data to managed object key information associated with respective existing managed objects in the managed object database to identify:

i) matching existing managed objects in the managed object database that correspond to the mapped management data; and ii) non-matching management data that does not match the existing managed objects in the managed object database, wherein the management data includes data structures having references to identities of other components operating in the storage area network and further includes management information from a storage device and management information from a host component, matching further comprising inferring, from the management information sent by a storage device in a storage array component, an additional component from key information indicative of a name of the inferred component.

15. The computer system of claim 14 wherein updating object data within the existing managed object with the matching management data comprises:

for each matching existing managed object:
identifying portions of the mapped management data that match corresponding portions of the matching existing managed object; and
determining if differences exist between that identified matching portions of the mapped management data and the matching corresponding portions of the matching existing managed objects, and if difference exist, replacing the identified matching corresponding portions of the matching existing object with the identified matching portions of the mapped management data such that the matching existing managed object is updated with the most recent management data.

16. The computer system of claim 15 wherein the management data corresponds to at least one existing component operating within the network; and wherein analyzing the management data to infer an existence of additional components operating in the network comprises:
detecting inferential data within the management data, the inferential data inferring existence of at least one inferred component operating in the network that shares a relationship with the at least one existing component in the network that corresponds to the management data;
querying the managed object database to determine if there is at least one existing managed object in the managed object database that corresponds to the at least one inferred component, and if there is not at least one existing managed object in the managed object database that corresponds to the at least one inferred component:
categorizing the inferential data into at least one managed object class; and
wherein creating new managed objects in the managed object database for components within the network whose existence is inferred comprises:
creating at least one new managed object in the managed object database for each of the at least one managed object class into which the inferential data was categorized; and
populating the at least one new managed object with management data associated with the inferential data.

17. The computer system of claim 16 wherein detecting inferential data within the management data further comprises:
detecting the evidence of operation of the at least one inter-component protocol between the at least one existing component in the network to which the management data corresponds and at least one inferred component, the detected operation of the at least one inter-component protocol inferring the existence of the at least one inferred component, wherein the inferred component correspond to a synchronicity protocol, the synchronicity protocol operable to maintain recoverability in the event of failure of a component conversant with another component via the synchronicity protocol.

18. The computer system of claim 16 wherein detecting inferential data within the management data comprises:
detecting, within the management data, existence of at least one inter-component data structure identifying at least one inferred component operating within the network.

19. The computer system of claim 16 wherein the inferential data infers the existence of at least one of a host component, a connectivity component and a storage device component operating within the network that the managed object database does not currently represent with an existing management object.

20. The computer system of claim 13 comprising repeating receiving management data, matching the management data, updating object data, creating at least one new managed object, analyzing the management data and creating new managed objects for components whose existence is inferred, such that over time, managed objects are created for components operating within the network that do not have corresponding agents for collection of management data.

21. A computer program product having a computer-readable medium including computer program logic encoded thereon that, when executed on a computer system having a coupling of a memory system, a processor, and an interface, maintains a database of manageable entities in a storage area network, the database operable to store network component data pertaining to existing network components defining manageable entities in the storage area network comprising:

computer program code for updating management data pertaining to existing manageable entities in the storage area network, each of the existing components further comprising a manageable entity responsive to a SAN management application in the storage area network;

computer program code for identifying new manageable entities referenced in the management data;

computer program code for detecting inferential data within the management data, the inferential data inferring existence of at least one inferred component operating in the network that shares a relationship with an existing component in the network that corresponds to the management data; and computer program code for inferring additional manageable entities from the identified and existing manageable entities, the additional manageable entities inferred from network component information in the management data indicative of operation the inferred manageable entities, wherein the inferential data infers the existence of at least one of a host component, a connectivity component and a storage device component operating within the network that the managed object database does not currently represent with an existing management object, the inferred manageable entities corresponding to a synchronicity protocol, the synchronicity protocol operable to maintain recoverability in the event of failure of a manageable entity conversant with another manageable entity via the synchronicity protocol.

22. A method for maintaining managed object data associated with components in a network, the method comprising:
receiving management data associated with components operating in a storage area network (SAN), the components defining manageable entities responsive to a SAN management application in the SAN;
matching the management data to existing objects in a managed object database, matching further comprising:
mapping the management data into a format comparable to the existing managed objects within the managed object database;
obtaining key information from the mapped management data; and
querying the managed object database to compare the key information from the mapped management data to managed object key information associated with respective existing managed objects in the managed object database to identify:
i) matching existing managed objects in the managed object database that correspond to the mapped management data; and
ii) non-matching management data that does not match the existing managed objects in the managed object database;
for each existing managed object that matches the management data, updating object data within the existing managed objects with the matching management data, the existing managed object corresponding to match mapped management data, updating further comprising identifying portions of the mapped management data that match corresponding portions of the matching existing managed object; and
determining if differences exist between that identified matching portions of the mapped management data and the matching corresponding portions of the matching existing managed objects, and if difference exist, replacing the identified matching corresponding portions of the matching existing object with the identified matching portions of the mapped management data such that the matching existing managed object is updated with the most recent management data;
for management data not matching the existing managed objects in the managed object database, creating at least one new managed object containing the non-matching management data;
analyzing the management data for network component information to infer an existence of additional components operating in the network that do not have corresponding managed objects in the managed object database; and
creating new managed objects in the managed object database for components within the network whose existence is inferred, the new managed objects including the non matching management data, the management data corresponding to at least one existing component operating within the network, wherein analyzing the management data to infer an existence of additional components operating in the network further comprises:
detecting inferential data within the management data, the inferential data inferring existence of at least one inferred component operating in the network that shares a relationship with the at least one existing component in the network that corresponds to the management data, the relationship based on corresponding mapped management data;
querying the managed object database to determine if there is at least one existing managed object in the managed object database that corresponds to the at least one inferred component, and if there is not at least one existing managed object in the managed object database that corresponds to the at least one inferred component: categorizing the inferential data into at least one managed object class; and wherein creating new managed objects in the managed object database for components within the network whose existence is inferred comprises:
creating at least one new managed object in the managed object database for each of the at least one managed object class into which the inferential data was categorized; and
populating the at least one new managed object with management data associated with the inferential data, the inferential data inferring the existence of at least one of a host component, a connectivity component and a storage device component operating within the network that the managed object database does not currently represent with an existing management object, the inferred manageable entities corresponding to a synchronicity protocol, the synchronicity protocol operable to maintain recoverability in the event of failure of a manageable entity conversant with another manageable entity via the synchronicity protocol.

23. The method of claim 22 wherein detecting inferential data within the management data comprises:
detecting, within the management data, evidence of operation of at least one inter-component protocol between the at least one existing component in the network to which the management data corresponds and at least one inferred component, the detected operation of the at least one inter-component protocol inferring the existence of the at least one inferred component, the intercomponent protocol including associated information between the at least one existing component and the at least one inferred component, wherein the at least one inter-component protocol operates between the existing component in the network to which the management data corresponds and the at least one inferred component and comprises at least one of:
i) a remote data facility maintenance protocol;
ii) a data mirroring protocol;
iii) a data migration protocol; and
iv) a peripheral control protocol.

24. The method of claim 21 wherein the network component information corresponds to at least one of a protocol, data structure, network name and event exchanged between manageable entities in the storage area network, and wherein the computer program code for inferring is operable to infer manageable entities corresponding to a synchronicity protocol, the synchronicity protocol operable to maintain recoverability in the event of failure of a manageable entity conversant with another manageable entity via the synchronicity protocol.

25. The method of claim 24 wherein the network component information includes data structures having references to identities of other components operation in the storage area network, and further includes management information from a storage device and information from a host component, the computer program code further operable to infer, from the management information sent by a storage device in a storage array component, an additional component from key information indicative of a name of the inferred component.

26. The method of claim 1 wherein the Inferred manageable entities correspond to a synchronicity protocol, the synchronicity protocol operable to maintain recoverability in the event of failure of a manageable entity conversant with another manageable entity via the synchronicity protocol, inferring further comprising inferring, from the management data sent by a storage device in a storage array component, an additional component from key information indicative of a name of the inferred component, the management information including data structures having references to identities of other components operating in the storage area network and the network component information corresponds to at least one of a protocol, data structure, network name and event exchanged between manageable entities in the storage area network.

27. A method for maintaining a database of manageable entities in a storage area network, the database operable to store network component data pertaining to network components defining manageable entities in the storage area network:

receiving management data associated with components operating in a network;

matching the management data to existing objects in a managed object database;

updating management data pertaining to existing manageable entities in the storage area network, each of the components further comprising a manageable entity responsive to a SAN management application in the storage area network, updating further comprising, for each existing managed object that matches the management data, updating object data within the existing managed objects with the matching management data;

for management data not matching the existing managed objects in the managed object database, creating at least one new managed object containing the non-matching management data;

analyzing the management data to infer an existence of additional components operating in the network that do not have corresponding managed objects in the managed object database;

detecting, within the management data, evidence of operation of at least one inter-component protocol; and creating new managed objects in the managed object database for components within the network whose existence is inferred, the management data corresponding to at least one existing manageable entity within the network; and identifying new manageable entities referenced in the management data; and inferring additional manageable entities from the identified and existing manageable entities, the additional manageable entities inferred from network component information in the management data indicative of operation the inferred manageable entities, wherein analyzing the management data to infer an existence of additional components operating in the network comprises:

detecting inferential data within the management data, the inferential data inferring existence of at least one inferred component operating in the network that shares a relationship with the at least one existing component in the network that corresponds to the management data; and querying the managed object database to determine if there is at least one existing managed object in the managed object database that corresponds to the at least one inferred component, and if there is not at least one existing managed object in the managed object database that corresponds to the at least one inferred component:

categorizing the inferential data into at least one managed object class, creating new managed objects in the managed object database for components within the network whose existence is inferred further comprising:

creating at least one new managed object in the managed object database for each of the at least one managed object class into which the inferential data was categorized; and populating the at least one new managed object with management data associated with the inferential data, detecting the inferential data within the management data further comprising detecting the evidence of operation of the at least one inter-component protocol between the at least one existing component in the network to which the management data corresponds and at least one inferred component, the detected operation of the at least one inter-component protocol inferring the existence of the at least one inferred component, wherein the inferential data infers the existence of at least one of a host component, a connectivity component and a storage device component operating within the network that the managed object database does not currently represent with an existing management object, the inferred manageable entities corresponding to a synchronicity protocol, the synchronicity protocol operable to maintain recoverability in the event of failure of a manageable entity conversant with another manageable entity via the synchronicity protocol.

28. The method of claim 5 wherein detecting the inter-component protocol includes identifying events generated as a result of the synchronizing protocol between data storage system components.

29. The method of claim 7 wherein inferring additional entities includes examining management data portions to identify references to identities of other components operating within the storage area network.

* * * * *